(12) United States Patent
Lee

(10) Patent No.: US 11,341,939 B2
(45) Date of Patent: May 24, 2022

(54) METHOD AND APPARATUS FOR IMPROVING VISIBILITY OF CLUSTER DESIGN ELEMENTS BASED ON DRIVER'S VIEW

(71) Applicant: Yellowknife Inc., Seoul (KR)

(72) Inventor: Han Sung Lee, Seoul (KR)

(73) Assignee: YELLOWKNIFE INC., Seoul (KR)

( * ) Notice: Subject to any disclaimer, the term of this patent is extended or adjusted under 35 U.S.C. 154(b) by 0 days.

(21) Appl. No.: 17/234,177

(22) Filed: Apr. 19, 2021

(65) Prior Publication Data

US 2021/0335326 A1 Oct. 28, 2021

(30) Foreign Application Priority Data

Apr. 23, 2020 (KR) ........................ 10-2020-0049581

(51) Int. Cl.
| | |
|---|---|
| *G09G 5/38* | (2006.01) |
| *G06T 7/70* | (2017.01) |
| *B60K 35/00* | (2006.01) |
| *G06F 3/01* | (2006.01) |

(52) U.S. Cl.
CPC ............... *G09G 5/38* (2013.01); *B60K 35/00* (2013.01); *G06F 3/013* (2013.01); *G06T 7/70* (2017.01); *B60K 2370/149* (2019.05); *B60K 2370/152* (2019.05); *B60K 2370/21* (2019.05); *G06T 2207/30201* (2013.01); *G06T 2207/30268* (2013.01); *G09G 2320/0613* (2013.01); *G09G 2340/0407* (2013.01); *G09G 2340/0464* (2013.01); *G09G 2340/0492* (2013.01); *G09G 2340/14* (2013.01); *G09G 2380/10* (2013.01)

(58) Field of Classification Search
CPC ... G06T 7/20; G06T 7/70; G06T 2207/30201; B60K 35/00; B60K 2370/149; G06F 3/013; G09G 2340/14; G09G 2340/0464; G09G 2340/0407; G09G 2320/0613; G09G 2207/30268
See application file for complete search history.

(56) References Cited

U.S. PATENT DOCUMENTS

| | | | | |
|---|---|---|---|---|
| 7,683,771 | B1 * | 3/2010 | Loeb ....................... | B63B 49/00 |
| | | | | 701/1 |
| 2016/0188190 | A1 * | 6/2016 | Ricci ...................... | B60W 40/09 |
| | | | | 715/745 |
| 2019/0375292 | A1 * | 12/2019 | Saito ....................... | B60K 35/00 |
| 2020/0074897 | A1 * | 3/2020 | Jung ....................... | B60K 35/00 |
| 2021/0263586 | A1 * | 8/2021 | Wang ....................... | B60R 11/04 |

FOREIGN PATENT DOCUMENTS

KR 10-2019-0050227 A 5/2019

\* cited by examiner

*Primary Examiner* — Edward Martello
(74) *Attorney, Agent, or Firm* — Maier & Maier, PLLC

(57) ABSTRACT

Embodiments relate to an apparatus for improving visibility of cluster design elements based on a driver's view, including an eye position detection unit to detect an eye position of the driver from a face image captured through a camera in a vehicle, a visible area determination unit to determine a visible area and an invisible area in a cluster based on the detected eye position, a position of the cluster in the vehicle and a position of a steering wheel, a display information detection unit to detect a position and shape of display information displayed on the cluster, and a display information design conversion unit to convert a position or shape of display information overlapping in the invisible area among the display information.

8 Claims, 10 Drawing Sheets

METHOD AND APPARATUS FOR IMPROVING VISIBILITY OF CLUSTER DESIGN ELEMENTS BASED ON DRIVER'S VIEW

TECHNICAL FIELD

Embodiments relate to an apparatus and method for improving visibility of cluster design elements based on a driver's view. More particularly, embodiments relate to technology that improves visibility by properly re-arranging or converting design elements hidden by a steering wheel.

BACKGROUND

In a vehicle, a cluster functions to display various information related to driving. For example, the cluster may display the conditions such as speed, engine RPM, remaining fuel quantity, coolant temperature, brake fluid, washer fluid, etc. Recently, the cluster is changed from analog to digital form, and with digitalization, a larger amount of information is displayed on the cluster and provided to a driver.

Meanwhile, since the steering wheel is positioned between the cluster screen and the driver, part of the cluster screen is hidden by the steering wheel. To solve this problem, Korean Patent Publication No. 10-2019-0050227 discloses technology that adjusts the position of the seat or the steering wheel. However, this method changes the driver's posture, causing fatigue to the driver.

SUMMARY

The present disclosure is aimed at making visible to a driver display information of the cluster displayed on an area invisible to the driver due to part of the cluster screen hidden behind the steering wheel by moving or converting the display information.

The present disclosure is aimed at providing technology that detects whether the display information displayed on the cluster screen is displayed in one or both eyes of the driver, and makes the information displayed in one eye more visible to the driver.

The present disclosure is aimed at improving visibility by lowering the resolution, substituting or enlarging the size of visual information entering only one eye of the driver.

The technical problem of the present disclosure is not limited to those mentioned above, and another technical problem not mentioned herein will be clearly understood by those skilled in the art from the following description.

An apparatus for improving visibility of cluster design elements based on a driver's view according to an embodiment of the present disclosure includes an eye position detection unit to detect an eye position of the driver from a face image captured through a camera in a vehicle, a visible area determination unit to determine a visible area and an invisible area in a cluster based on the detected eye position, a position of the cluster in the vehicle and a position of a steering wheel, a display information detection unit to detect a position and shape of display information displayed on the cluster, and a display information design conversion unit to convert a position or shape of display information overlapping in the invisible area among the display information.

In a preferred embodiment, the eye position detection unit may detect the eye position of each of left and right eyes of the driver, the visible area determination unit may divide the visible area in the cluster into a binocular visible area and a monocular visible area, and the display information design conversion unit may convert a position or shape of display information overlapping in the monocular visible area among at least one display information displayed in the cluster.

In a preferred embodiment, the display information design conversion unit may convert the position or shape of the display information overlapping in the monocular visible area to place the display information in the visible area.

In a preferred embodiment, the display information detection unit may calculate complexity of the display information overlapping in the monocular visible area, the display information design conversion unit may determine whether to convert the shape or position of the display information overlapping in the monocular visible area based on the calculated complexity, and the complexity may be determined based on an amount and variation of color information included in a unit area within the cluster.

In a preferred embodiment, the display information design conversion unit may lower a resolution of part or the entirety of the display information overlapping in the monocular visible area.

In a preferred embodiment, the display information detection unit may detect whether part or the entirety of the display information overlaps in the monocular visible area and the invisible area, and the display information design conversion unit may move the position of the display information when the entire display information overlaps, and reduce a size of the display information or rotates the display information when part of the display information overlaps.

A method for improving visibility of cluster design elements based on a driver's view according to an embodiment of the present disclosure is performed by a computing device, and the method may include detecting an eye position of the driver from a face image captured through a camera in a vehicle, determining a visible area and an invisible area in a cluster based on the detected eye position, a position of the cluster in the vehicle and a position of a steering wheel, detecting a position and shape of display information displayed on the cluster, and a display information design conversion step of converting a position or shape of display information overlapping in the invisible area among the display information.

A computer program according to an embodiment of the present disclosure may be stored in a computer-readable recording medium to perform the above-described method and may be executed in combination with hardware.

According to an embodiment of the present disclosure, the display information of the cluster displayed on an area invisible to the driver to part of the cluster screen hidden by the steering wheel is made visible to the driver by movement or conversion.

Additionally, according to an embodiment of the present disclosure, it is possible to provide technology that detects whether the display information displayed on the cluster screen is displayed in one or both eyes of the driver, and makes the information displayed in one eye more visible to the driver.

Furthermore, according to an embodiment of the present disclosure, it is possible to improve visibility by lowering the resolution, substituting or enlarging the size of visual information entering only one eye of the driver.

The effect of the present disclosure described herein is not limited to those described above, and it should be understood that the effect of the present disclosure may be expanded to a variety of effects that may be derived from the following detailed description of the embodiments of the present disclosure.

DETAILED DESCRIPTION OF THE EMBODIMENTS

Figure 1:
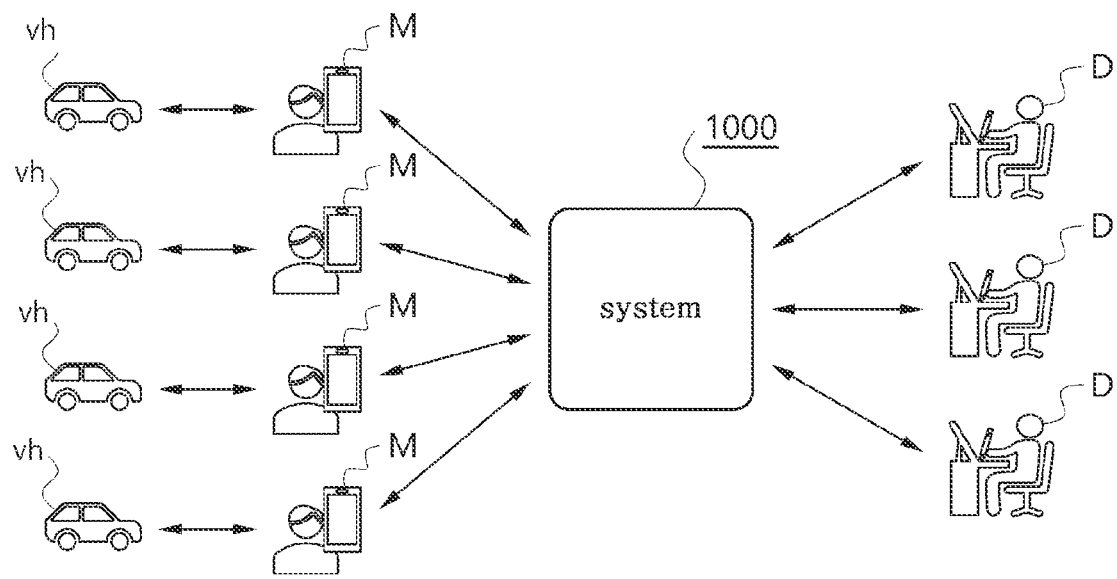
FIG. 1 shows an operating environment of a design management system (Aurora System™) which manages cluster design elements according to an embodiment of the present disclosure.

In describing an embodiment of the present disclosure, when a certain description of well-known elements or functions is deemed to make the subject matter of an embodiment of the present disclosure ambiguous, its detailed description is omitted herein. Additionally, in the drawings, elements irrelevant to the description of an embodiment of the present disclosure are omitted herein, and like reference signs are affixed to like elements.

In an embodiment of the present disclosure, when an element is referred to as being "connected", "coupled" or "linked" to another element, this may include not only a direct connection relationship but also an indirect connection relationship in which intervening elements are present. Additionally, unless expressly stated to the contrary, "comprise" or "include" when used in this specification, specifies the presence of stated elements but does not preclude the presence or addition of one or more other elements.

In an embodiment of the present disclosure, the terms "first", "second" and the like are used to distinguish an element from another, and do not limit the order or importance between elements unless otherwise mentioned. Accordingly, a first element in an embodiment may be referred to as a second element in other element within the scope of embodiments of the present disclosure, and likewise, a second element in an embodiment may be referred to as a first element in other embodiment.

In an embodiment of the present disclosure, the distinguishable elements are intended to clearly describe the feature of each element, and do not necessarily represent the separated elements. That is, a plurality of elements may be integrated into one hardware or software, and an element may be distributed to multiple hardware or software. Accordingly, although not explicitly mentioned, the integrated or distributed embodiment is included in the scope of embodiments of the present disclosure.

In the specification, a network may be a concept including a wired network and a wireless network. In this instance, the network may be a communication network that allows data exchange between a device and a system and between devices, and is not limited to a particular network.

The embodiment described herein may have aspects of entirely hardware, partly hardware and partly software, or entirely software. In the specification, "unit", "apparatus" or "system" refers to a computer related entity such as hardware, a combination of hardware and software, or software. For example, the unit, module, apparatus or system as used herein may be a process being executed, a processor, an object, an executable, a thread of execution, a program and/or a computer, but is not limited thereto. For example, both an application running on a computer and the computer may correspond to the unit, module, apparatus or system used herein.

Additionally, the device as used herein may be a mobile device such as a smartphone, a tablet PC, a wearable device and a Head Mounted Display (HMD) as well as a fixed device such as a PC or an electronic device having a display function. Additionally, for example, the device may be an automotive cluster or an IoT (Internet of Things) device. That is, the device as used herein may refer to devices on which an application can run, and is not limited to a particular type. In the following description, for convenience of description, a device on which an application runs is referred to as the device.

In the present disclosure, there is no limitation in the communication method of the network, and a connection between each element may not be made by the same network method. The network may include a communication method using a communication network (for example, a mobile communication network, a wired Internet, a wireless Internet, a broadcast network, a satellite network, etc.) as well as near-field wireless communication between devices. For example, the network may include all communication methods that enable networking between objects, and is not limited to wired communication, wireless communication, 3G, 4G, 5G, or other methods. For example, the wired and/or wireless network may refer to a communication network by at least one communication method selected from the group consisting of Local Area Network (LAN), Metropolitan Area Network (MAN), Global System for Mobile Network (GSM), Enhanced Data GSM Environment (EDGE), High Speed Downlink Packet Access (HSDPA), Wideband Code Division Multiple Access (W-CDMA), Code Division Multiple Access (CDMA), Time Division Multiple Access (TDMA), Bluetooth, Zigbee, Wi-Fi, Voice over Internet Protocol (VoIP), LTE Advanced, IEEE802.16m, WirelessMAN-Advanced, HSPA+, 3GPP Long Term Evolution (LTE), Mobile WiMAX (IEEE 802.16e), UMB (formerly EV-DO Rev. C), Flash-OFDM, iBurst and MBWA (IEEE 802.20) systems, HIPERMAN, Beam-Division Multiple Access (BDMA), World Interoperability for Microwave Access (Wi-MAX) or communication using ultrasonic waves, but is not limited thereto.

The elements described in a variety of embodiments are not necessarily essential, and some elements may be optional. Accordingly, an embodiment including some of the elements described in the embodiment is also included in the scope of embodiments of the present disclosure. Additionally, in addition to the elements described in a variety of embodiments, an embodiment further including other elements is also included in the scope of embodiments of the present disclosure.

Hereinafter, the embodiments of the present disclosure will be described in detail with reference to the accompanying drawings.

FIG. 1 shows an operating environment of a design management system 1000 (Aurora System™) which manages cluster design elements according to an embodiment of the present disclosure. Referring to FIG. 1, the design management system 1000 may receive a cluster related design from a plurality of designers D. The "cluster related design" may include a user interface design (hereinafter, a cluster UI design) displayed on a vehicle cluster vh and/or a corresponding user interface design (hereinafter, a smartphone UI design) of a user device M (for example, a smartphone).

The cluster UI design and the smartphone UI design may include a plurality of display information (design elements), and the display information may be dynamically changed. Additionally, the display information may be changed through user interaction. For example, the display information that constitutes the cluster UI design may be any aesthetic image or functional image showing a specific function. The functional image may include the automotive speedometer, RPM, fuel level, coolant, open door, weather and navigation information, but is not limited thereto.

The cluster related design created by the designer may be received and managed by the design management system 1000 through a web or an app provided by the design management system 1000. Additionally, the design management system 1000 may provide the cluster related design to the user device or an automotive system (directly or via the user device) through the web or the app. Additionally, the provided cluster related design may be modified or complemented by the designer or the design management system and may be updated.

When a variety of cluster related designs are provided to the user, the user may choose a desired cluster related design and apply it to his/her smartphone or the cluster.

Meanwhile, a steering wheel is positioned between a cluster screen and a driver, and part of the driver's view is hidden by the steering wheel, and since very various cluster UI designs are provided by the design management system 1000, it is impossible to predict the state or type of display information hidden by the steering wheel.

Figure 2:
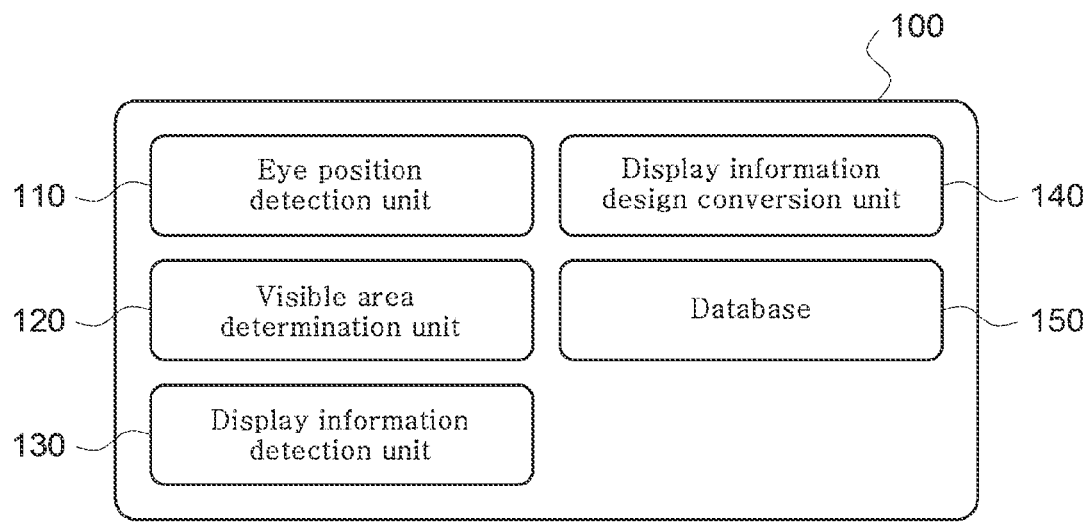
FIG. 2 is a diagram showing a relationship between a driver, a steering wheel St and a cluster in a vehicle.

FIG. 2 is a diagram showing a relationship between the driver, the steering wheel St and the cluster 10 in the vehicle. Referring to FIG. 2, when the driver's view is hidden by the steering wheel, the driver can only see an area by a gaze path P2, not P1.

The design management system 1000 according to an embodiment of the present disclosure may provide a method for improving visibility of cluster design elements based on a driver's view, a computer program or an apparatus for performing the same.

Figure 3:
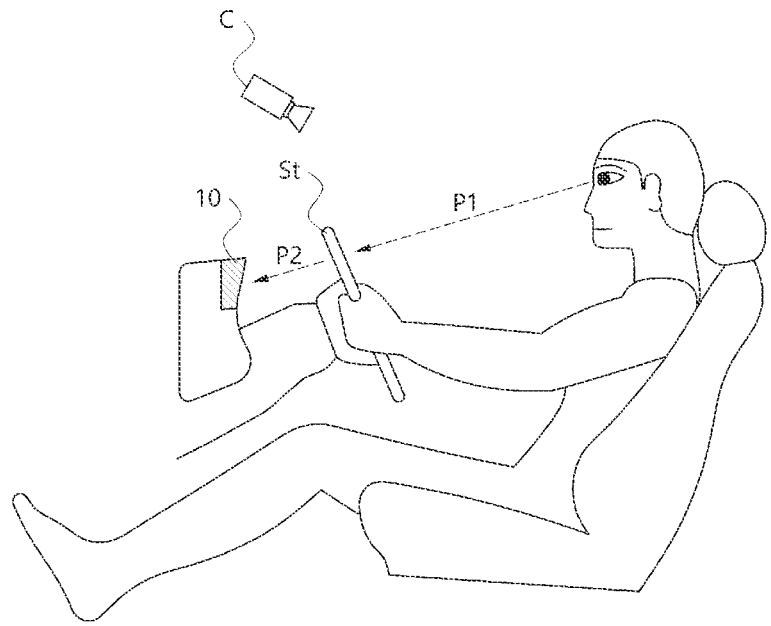
FIG. 3 is a block diagram of an apparatus for improving visibility of cluster design elements based on a driver's view according to an embodiment of the present disclosure.

FIG. 3 is a block diagram of an apparatus for improving visibility of cluster design elements based on a driver's view according to an embodiment of the present disclosure. The apparatus 100 for improving visibility of cluster design elements based on a driver's view may be included in the design management system 1000, i.e., an external server that is separate from the vehicle, or a control system inside the vehicle, but is not limited thereto.

Referring to FIG. 3, the apparatus 100 for improving visibility of cluster design elements based on a driver's view may include an eye position detection unit 110, a visible area determination unit 120, a display information detection unit 130 and a display information design conversion unit 140, and in other embodiments, may further include a database 150. The database 150 may store the cluster related design and its updates.

In other embodiments, the apparatus 100 may include more components than those of FIG. 3 according to the nature of the apparatus applied. For example, the apparatus 100 may further include a variety of components such as a transceiver, a Global Positioning System (GPS) module, an acceleration sensor or a gyro sensor, various types of physical buttons, buttons using a touch panel, input/output ports and a vibrator for vibration.

In an embodiment of the present disclosure, the eye position detection unit 110 may detect the driver's eye position from a face image captured through a camera c (see FIG. 2) in the vehicle.

The camera c may be any image processing device that digitalizes an external image through an image sensor. The camera c may be a charge-coupled device (CCD) camera, but is not limited thereto. Additionally, the camera c may be a mono camera or a stereo camera, and may be mounted on the front, lateral or rear side of the driver.

The eye position detection unit 110 may detect the 3-dimensional position of the driver's eyes in the vehicle using the position of the camera in the vehicle and the image acquired through the camera. For example, the eye position detection unit 110 may detect the eye position of each of the left and right eyes of the driver.

The visible area determination unit 120 may determine a visible area and an invisible area in the cluster based on the detected eye position, the position of the cluster in the vehicle and the position of the steering wheel. In more detail, the visible area determination unit 120 may determine the visible area and the invisible area further using the shape of the cluster (the shape of the screen) and the shape of the steering wheel. Information about the shape of the cluster and the shape and position of the steering wheel may be received from the sensor in the vehicle or the user.

Figure 4:
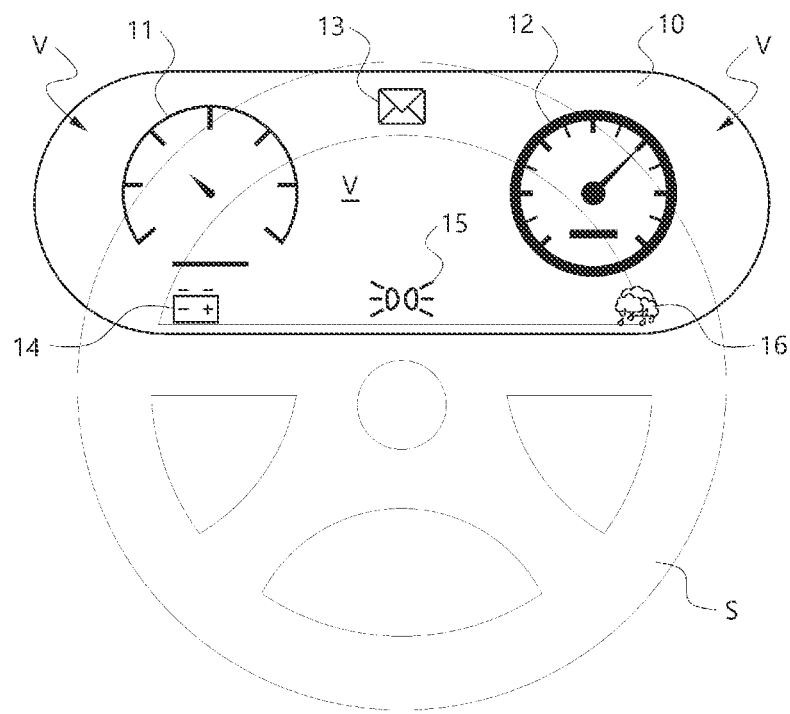
FIG. 4 is a diagram showing a variety of display information displayed on a cluster and an invisible area s hidden by a steering wheel and a visible area v not hidden by the steering wheel.

FIG. 4 is a diagram showing various display information 11 to 16 displayed on the cluster 10, the invisible area s hidden by the steering wheel and the visible area v not hidden by the steering wheel. The cluster UI design shown in FIG. 4 is provided by way of example and other cluster UI designs may have other shapes and structures.

Referring to FIG. 4, the driver can see the entire headlight display information 15 positioned in the visible area, but can see only parts of RPM display information 11 and speed display information 12 partially overlapping in the invisible area s, and cannot see email reception display information 13 and weather display information 16 wholly overlapping (included) in the invisible area s. Accordingly, the apparatus 100 for improving visibility according to an embodiment of the present disclosure detects display information invisible to the driver and converts the display information to allow the driver to see the display information.

The display information detection unit 130 may detect the position and shape of display information displayed on the cluster 10. The position and shape of the display information may be included in cluster related design information. The display information detection unit 130 may determine the position and shape of display information currently displayed on the cluster using information about the position and shape of each display information included in the cluster related design information.

The display information design conversion unit 140 may convert the position or shape of display information partially or wholly overlapping in the invisible area s among the display information.

Figure 5:
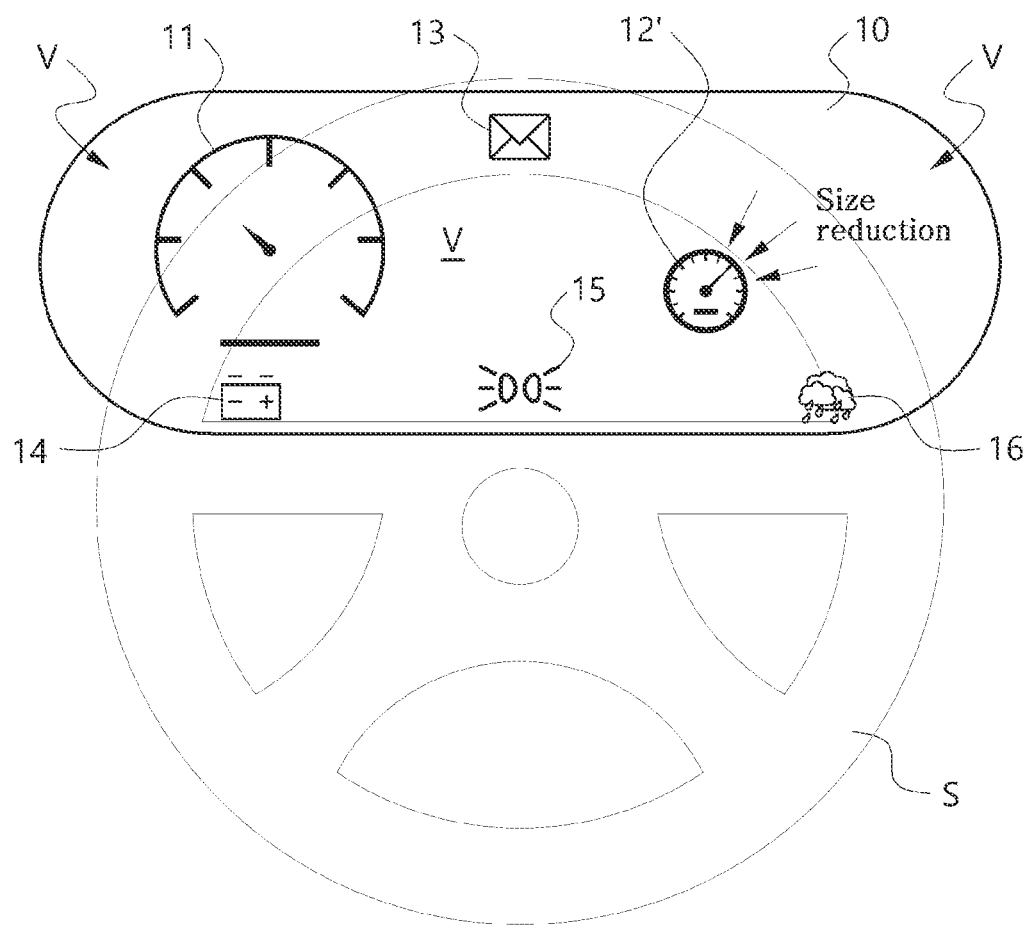
FIG. 5 shows an example of conversion of display information included in an invisible area s according to an embodiment of the present disclosure.

FIG. 5 shows an example of conversion of the display information 12 included in the invisible area s according to an embodiment of the present disclosure. Referring to FIG. 5, the display information design conversion unit 140 may reduce the size of the speed display information 12 to place the speed display information 12 outside of the invisible area s, and when reducing the size, the reference point is set to the outside of the invisible area s to place the reduced display information 12' outside of the invisible area s.

In another embodiment, the display information design conversion unit 140 may convert a design element into another design element having the same function. For example, a circular analog speedometer may be converted into a digital speedometer design element representing numbers.

Figure 6:
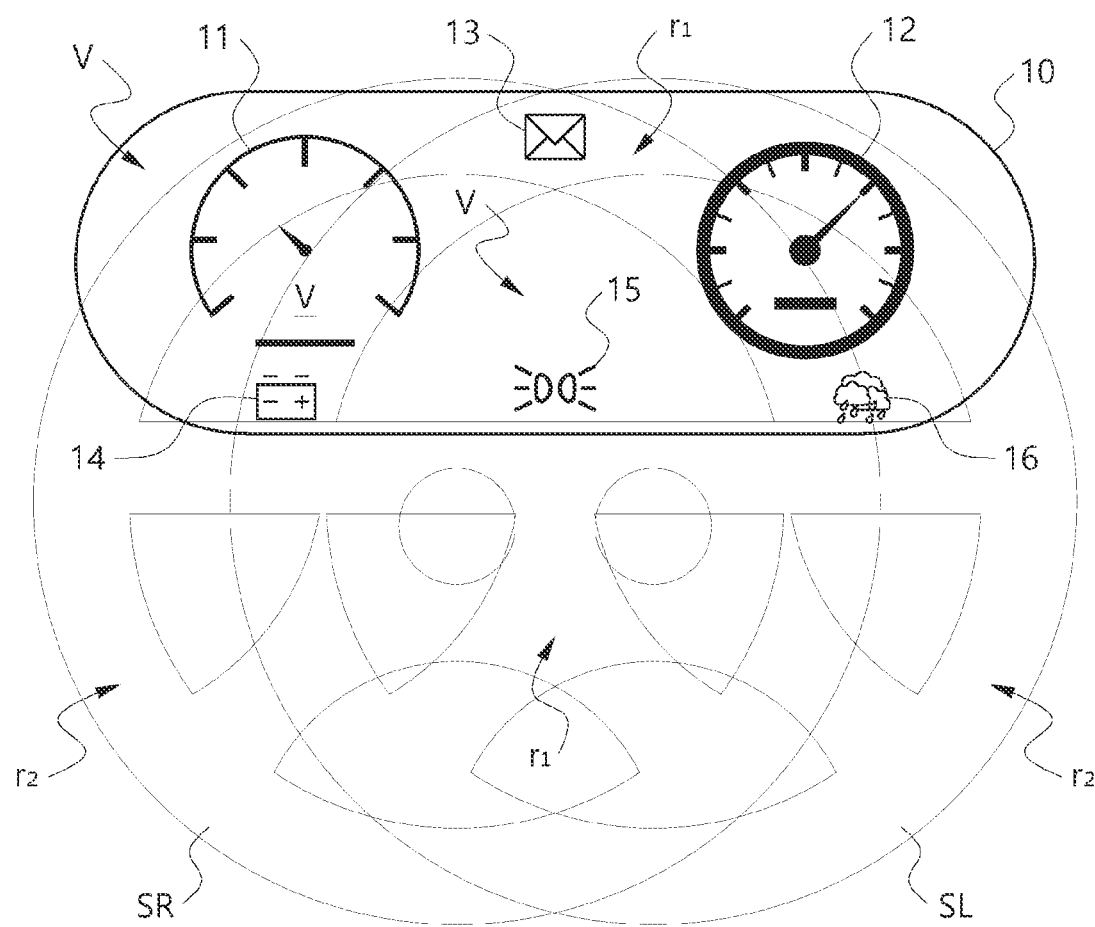
FIG. 6 shows an example of a visible area and an invisible area divided according to another embodiment of the present disclosure.

FIG. 6 shows an example of the visible area and the invisible area divided according to another embodiment of the present disclosure. Actually, most of people have both eyes spaced a predetermined distance apart. Accordingly, areas visible to each eye and areas hidden by the steering wheel are different, and an area invisible to both eyes is the invisible area.

Referring to FIG. 6, an invisible area SR recognized by the driver's right eye and an invisible area SL recognized by the left eye are shown. In the specification, an area not substantially visually recognized by the driver is where SR and SL overlap and is referred to as an invisible area r1, and an area visible to one eye but invisible to the other eye is referred to as a monocular visible area r2 in the description of the embodiments.

Referring to FIG. 6, the email display information 13 is positioned in the invisible area r1, and the weather display information 16 is positioned in the monocular visible area r2. Additionally, the headlight display information 15 is positioned in the visible area (or a binocular visible area) v. Additionally, the battery display information partially overlaps in the monocular visible area r2.

Figure 7:
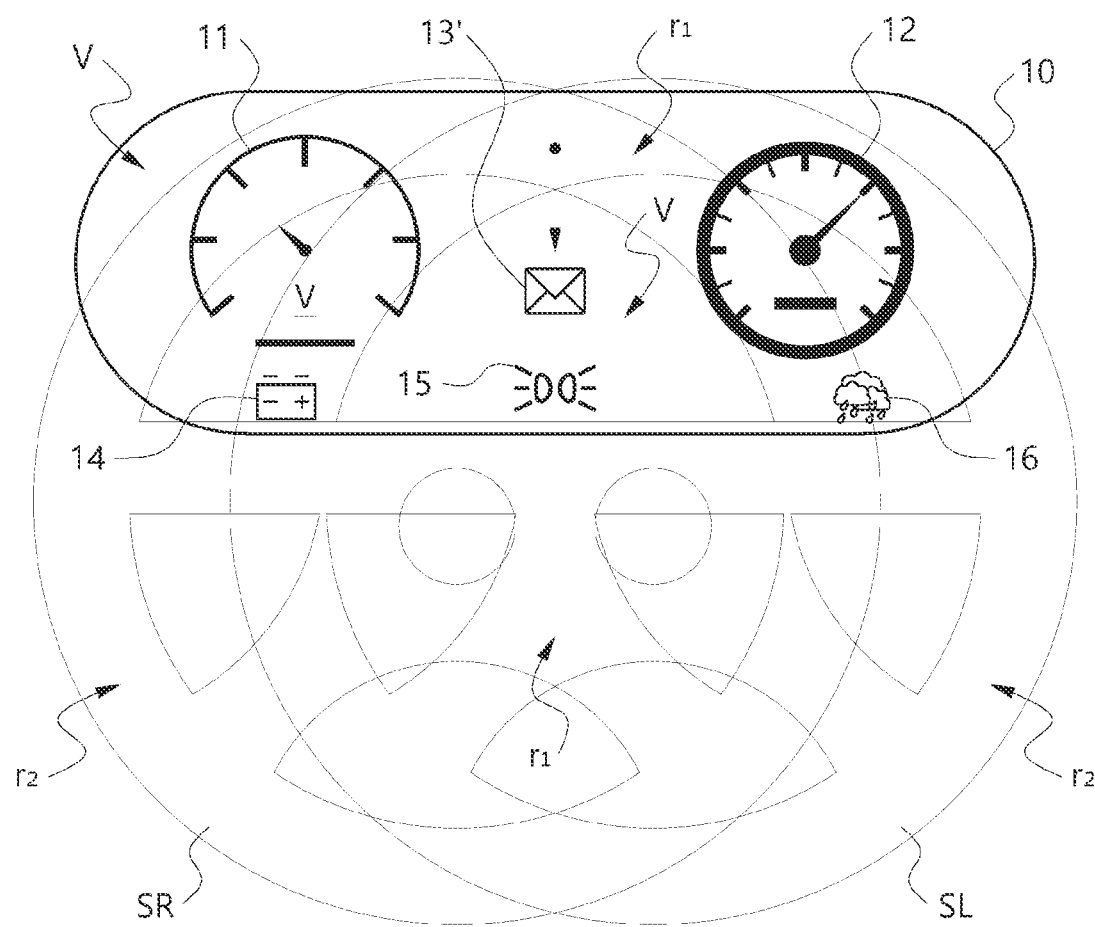
FIG. 7 shows an example of conversion of display information positioned in an invisible area according to an embodiment.

FIG. 7 shows an example of conversion of display information positioned in the invisible area r1 according to an embodiment. As with the binocular and monocular visible and invisible areas divided as described above, the display information design conversion unit 140 may convert display information included in the invisible area. FIG. 7 shows email display information 13' moved to the visible area v. The display information design conversion unit 140 may move display information included in the invisible area r1 to a nearest visible area, or a visible area at a short distance where other display information is present at a low density among visible areas to which the display information can move. That is, the movement destination of the display information may be determined based on the distance or density.

When the monocular visible area, the binocular visible area and the invisible area are divided, an embodiment of the present disclosure may process display information overlapping in the monocular visible area by various methods.

To this end, first, the visible area determination unit 120 divides the visible area in the cluster into a binocular visible area and a monocular visible area. Subsequently, the display information design conversion unit 140 may convert the position or shape of display information overlapping in the monocular visible area r2 among at least one display information displayed within the cluster 10.

In an embodiment, the display information design conversion unit 140 may convert the position or shape of display information overlapping in the monocular visible area to place the display information in the visible area. That is, the display information design conversion unit 140 may only move the position without size or shape conversion. Additionally, when moving the position, the movement direction or destination may be determined, taking into account the distance between the original position and the visible area available for movement or the density of the corresponding destination (the number of adjacent display information) as described above.

Figure 8:
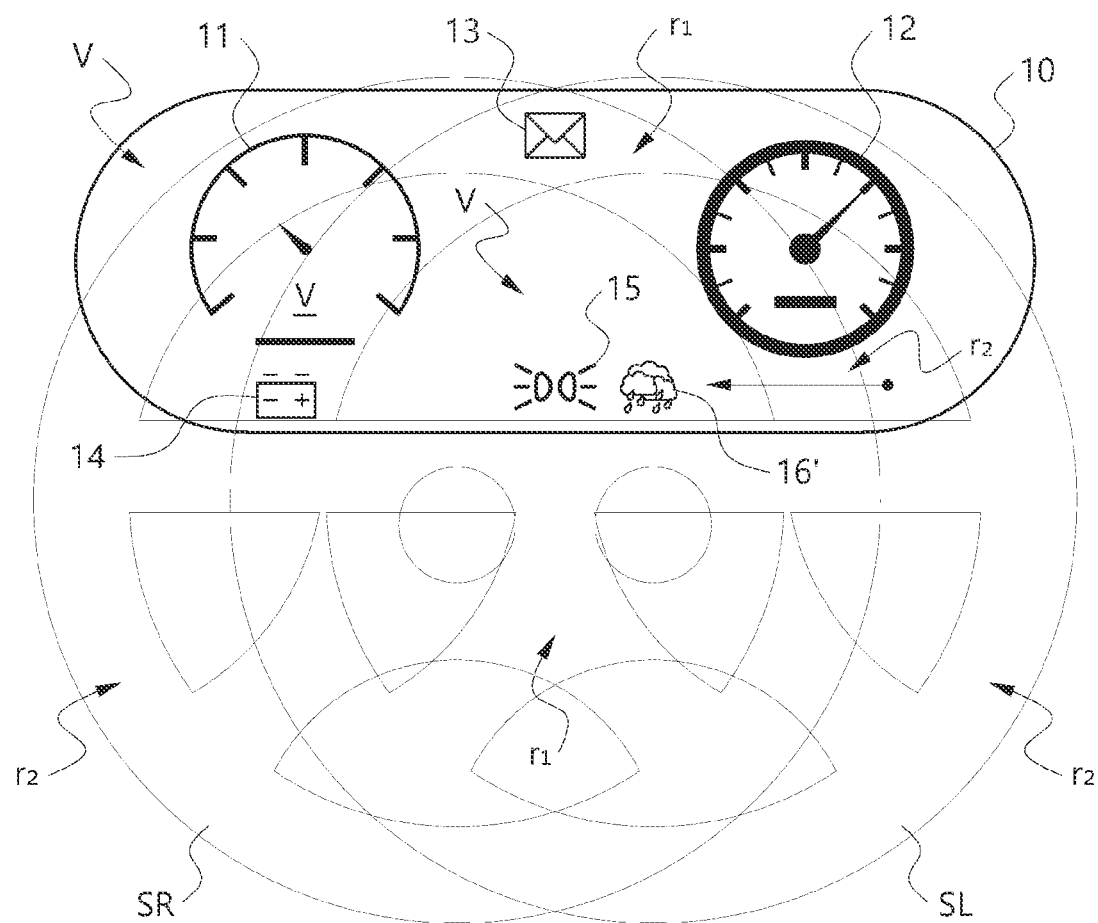
FIG. 8 shows the position movement of weather display information positioned in a monocular visible area according to the above-mentioned embodiment.

FIG. 8 shows the position movement of the weather display information 16 positioned in the monocular visible area r2 according to the above-mentioned embodiment. Referring to FIG. 8, weather display information 16' is moved to and displayed in the visible area. Although the example of FIG. 8 shows the movement of the weather display information considering the distance, the weather display information would be moved between the email display information and the headlight display information when considering the density together according to other example.

The processing of the display information positioned in the monocular visible area according to an embodiment of the present disclosure may be determined according to a predetermined criterion. For example, whether to move the position or convert the display information may be determined based on complexity of the display information. The complexity is determined based on the amount and variation of color information included in the unit area within the cluster and its detailed description will be provided below.

In an embodiment, the display information detection unit 130 may calculate the complexity of the display information 16 overlapping in the monocular visible area r2. Subsequently, the display information design conversion unit 140 may determine whether to convert the shape or position of the display information overlapping in the monocular visible area r2 based on the calculated complexity.

Figure 9:
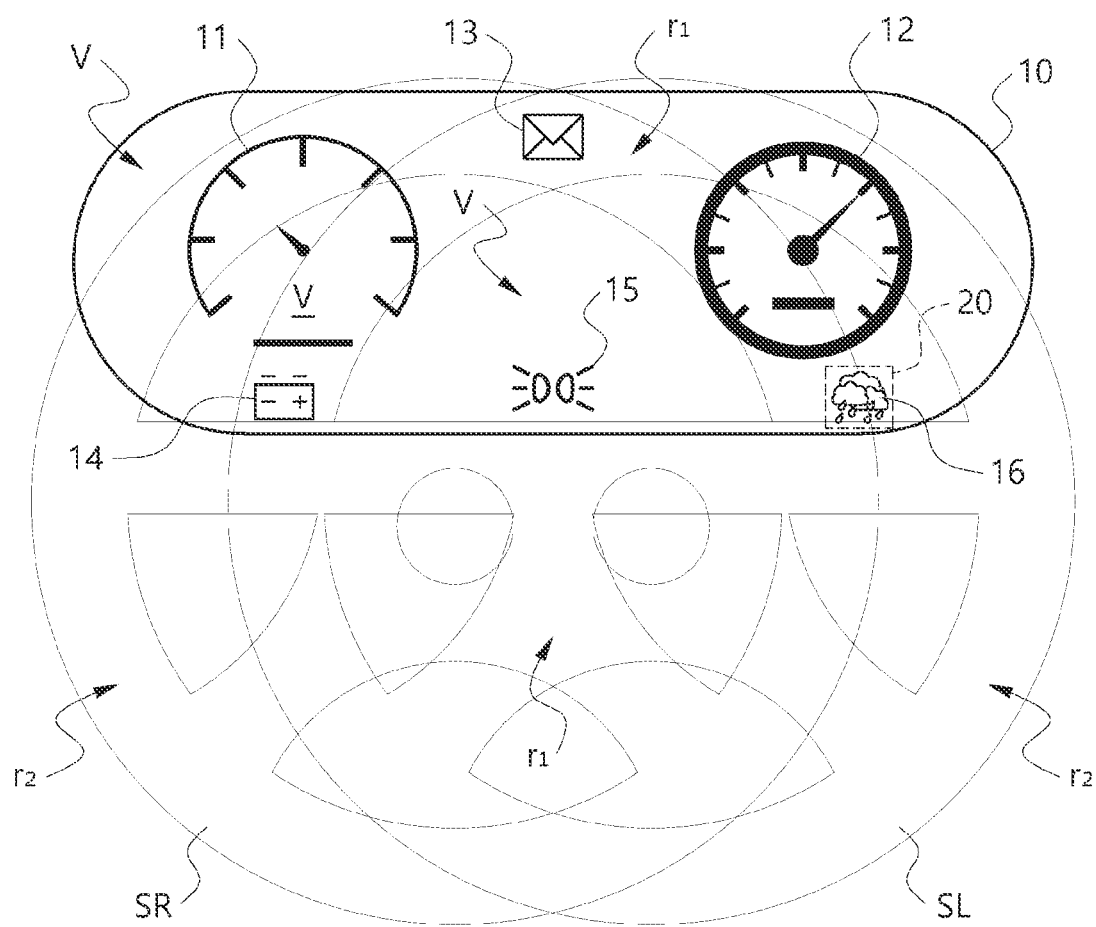
FIG. 9 shows an example of unit area setting for complexity calculation.

FIG. 9 shows an example of unit area setting for complexity calculation. Referring to FIG. 9, the unit area in the cluster may be any square or polygonal area that covers specific display information. In this case, in FIG. 9, the size of the unit area of the weather display information 16 and the size of the unit area of the speedometer display information 12 may be different from each other. In particular, the speedometer display information 12 is divided into two parts and included in the monocular visible area r2, and thus two unit areas may be formed. Hereinafter, for simplicity of description, description is made based on the weather display information.

The display information detection unit 130 may calculate the complexity based on the amount of color information included in the unit area 20. For example, a complexity value may be determined using at least one of the number of colors, the number of pixels, the resolution or the extent of color change included in the unit area as a complexity calculation factor, and may be compared with a preset threshold.

Referring to FIG. 9, the email display information or the headlight display information is designed in a simple black and white line, while the weather display information has more color information and higher color variation. That is, the weather display information may be evaluated as having higher complexity.

Figure 10:
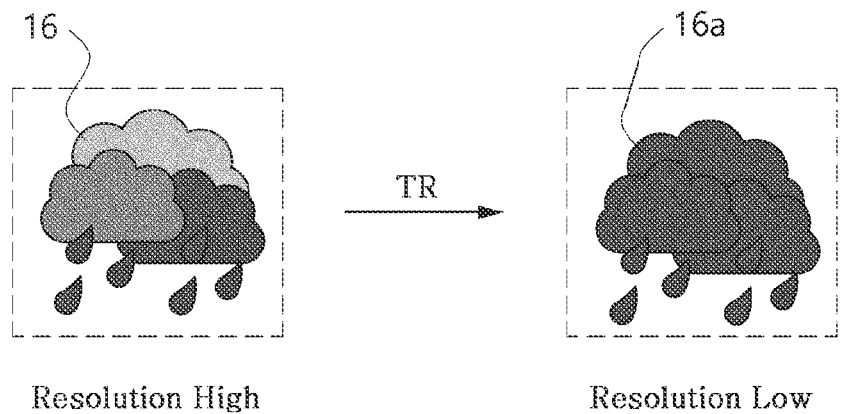
FIG. 10 shows an example of conversion of weather display information shown in FIG. 9 by a display information design conversion unit according to an embodiment.

FIG. 10 shows an example of conversion of the weather display information 16 shown in FIG. 9 by the display information design conversion unit 140 according to an embodiment. For example, the display information design conversion unit 140 may lower the resolution of part or the entirety of the display information overlapping in the monocular visible area. Referring to FIG. 10, the weather display information 16 with high resolution may be converted into weather display information 16a with low resolution. Although FIG. 10 shows resolution conversion, in other embodiments, color conversion (reducing the number of colors or changing to simpler color) may be performed together or independently. Alternatively, the display information may be substituted by a different (simpler) image having the same meaning. In substituting by other display information, substitute display information may be selected from display information having the same function or meaning set by the designer or the manager.

Figure 11:
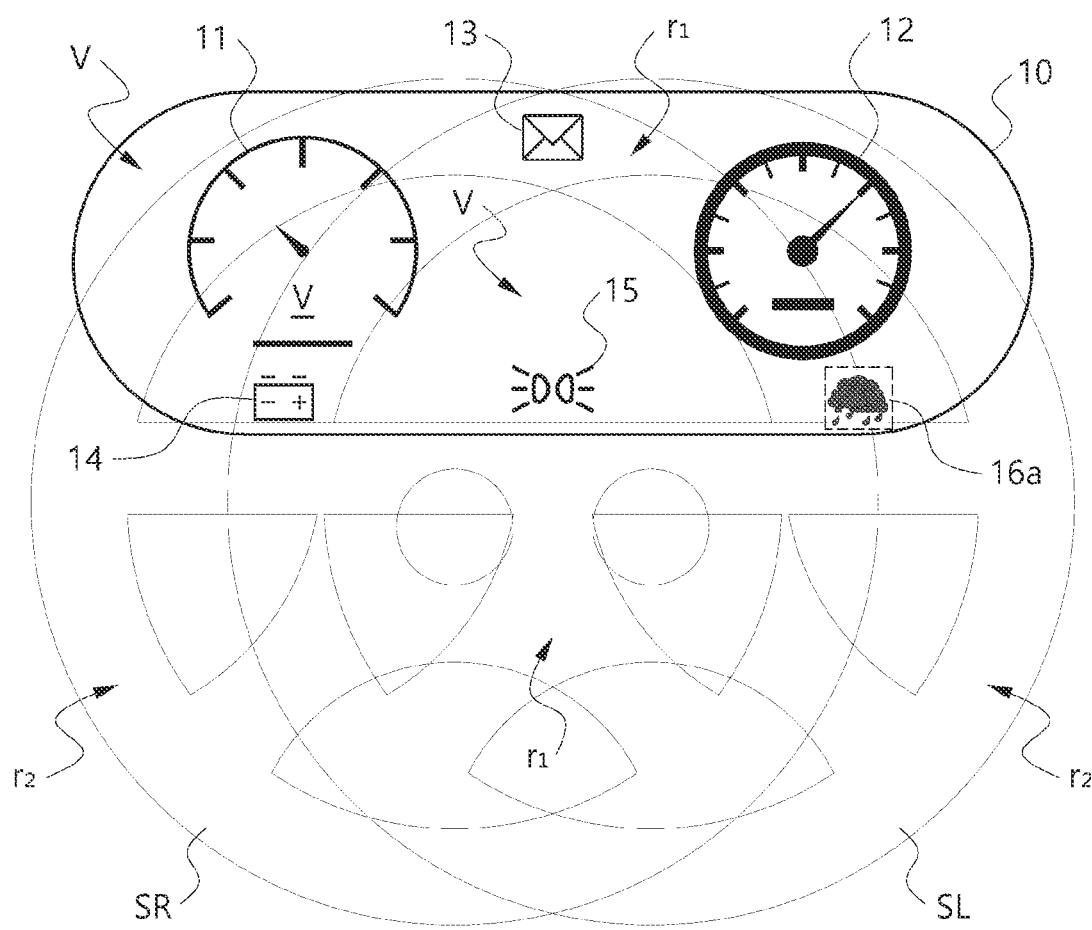
FIG. 11 shows the conversion and display of display information included in a monocular visible area into low resolution according to an embodiment of the present disclosure.

FIG. 11 shows the conversion and display of display information included in the monocular visible area into low resolution according to an embodiment of the present disclosure. Referring to FIG. 11, display information corresponding to the monocular visible area and looking somewhat obscure to the driver may be simplified to allow the driver to recognize more clearly.

Figure 12:
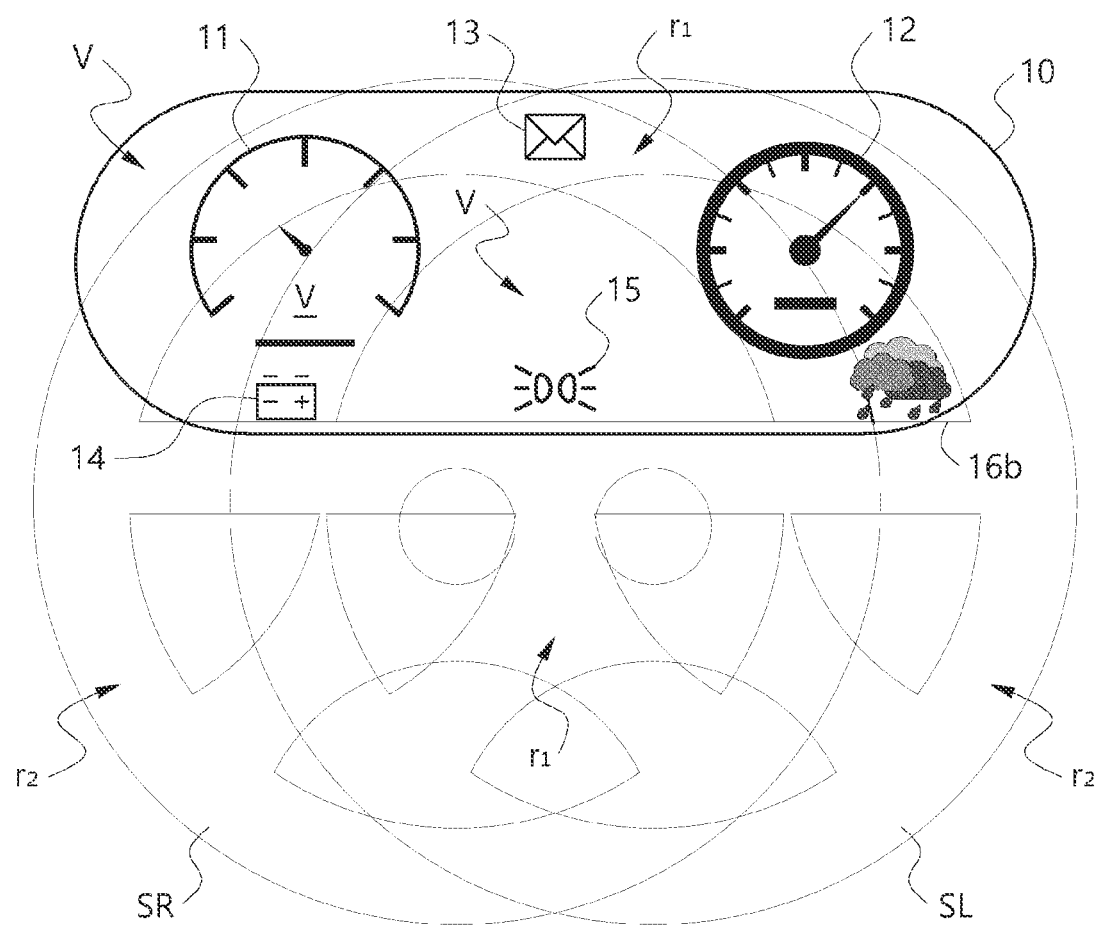
FIG. 12 shows the size change of display information included in a monocular visible area according to an embodiment of the present disclosure.

FIG. 12 shows the size change of display information included in the monocular visible area according to an embodiment of the present disclosure. FIG. 12 shows that display information displayed in the monocular visible area is enlarged to make it more visible to the driver. Additionally, FIG. 12 shows display information converted into a simpler image 16b. Although FIG. 12 shows that display information image conversion and size conversion are applied together, it should be understood that any one of the two conversions may be selectively performed in other embodiments.

In the embodiments of the present disclosure, part or the entirety of the display information may overlap in the monocular visible area or the invisible area, and processing may be different depending on how much the display information overlaps. To this end, the display information detection unit 130 may detect whether part or the entirety of the display information overlaps in the monocular visible area and the invisible area.

Subsequently, when the entire display information overlaps, the display information design conversion unit 140 may move the position of the display information, and when part of the display information overlaps, may reduce the size of the display information or rotate the display information. When the entire display information overlaps, the position movement of the display information may be a vertical or horizontal movement, and may involve a rotation movement.

Figure 13:
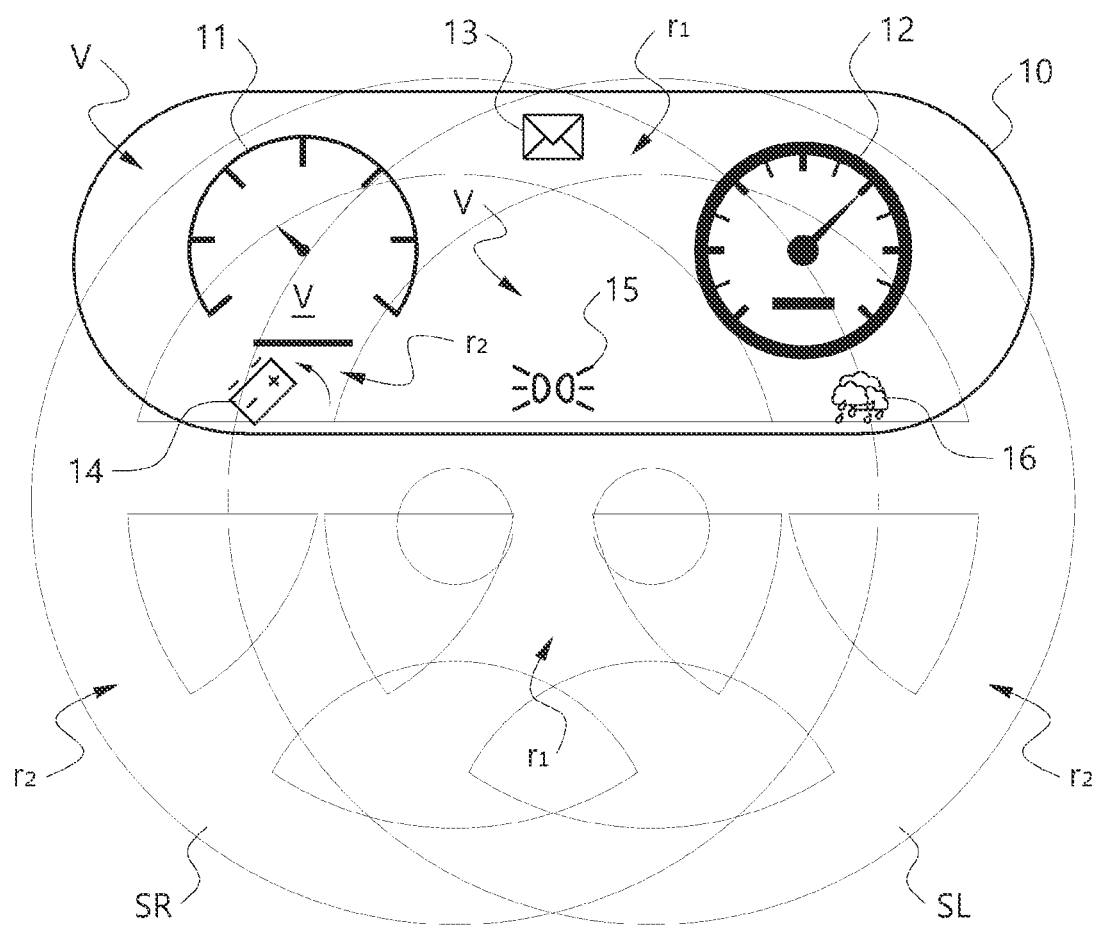
FIG. 13 shows an example of rotation conversion of display information according to an embodiment of the present disclosure.

FIG. 13 shows an example of rotation conversion of display information according to an embodiment of the present disclosure. While description is made with reference to FIGS. 6 and 13, FIG. 6 shows the display information in a basic state before conversion, and FIG. 13 shows the display information in a design converted state. Referring to FIG. 6, the battery display information 14 overlaps in the monocular visible area r2, and the display information design conversion unit performs rotation conversion of the display information 14 to place the entire battery display information 14 in the visible area v. In the rotation conversion, the display information design conversion unit 140 may determine the rotation direction based on the shape of the invisible area r2 overlapping with the display information 14. In the case of the embodiment of FIG. 13, the boundary of the monocular visible area r2 curves to the right and vertically goes through the display information 14, and thus the display information design conversion unit rotates the display information 14 in the counterclockwise direction to minimize the amount of rotation and the horizontal movement.

The method for improving visibility of cluster design elements based on a driver's view according to an embodiment of the present disclosure may be performed by the components of the apparatus 100 for improving visibility of cluster design elements based on a driver's view described above. The method for improving visibility of cluster design elements based on a driver's view may include detecting the driver's eye position from a face image captured through the camera in the vehicle, determining a visible area and an invisible area in the cluster based on the detected eye position, the position of the cluster in the vehicle and the position of the steering wheel, detecting the position and shape of display information displayed on the cluster, and the display information design conversion step of converting the position or shape of display information overlapping in the invisible area among the display information. Additionally, the method for improving visibility of cluster design elements based on a driver's view may include various embodiments implemented by each component of the apparatus for improving visibility of cluster design elements based on a driver's view described above.

The computer program according to an embodiment of the present disclosure may be stored in computer-readable recording media, and the computer program may include instructions for performing the method for improving visibility of cluster design elements based on a driver's view described above.

While the present disclosure has been hereinabove described with reference to the embodiments shown in the drawings, this is provided for illustration purposes only and it will be appreciated by those having ordinary skill in the art that various modifications and variations may be made thereto. However, it should be noted that such modifications fall in the technical protection scope of the present disclosure. Therefore, the true technical protection scope of the present disclosure should be defined as including other embodiments and other examples by the technical spirit of the appended claims and the equivalents to the appended claims.

The invention claimed is:

1. An apparatus for improving visibility of cluster design elements based on a driver's view, comprising:
   an eye position detection unit to detect an eye position of the driver from a face image captured through a camera in a vehicle;
   a visible area determination unit to determine a visible area and an invisible area in a cluster based on the detected eye position, a position of the cluster in the vehicle and a position of a steering wheel;

a display information detection unit to detect a position and shape of display information displayed on the cluster; and a display information design conversion unit to convert a position or shape of display information overlapping in the invisible area among the display information.

2. The apparatus for improving visibility of cluster design elements based on a driver's view according to claim 1, wherein the eye position detection unit detects the eye position of each of left and right eyes of the driver, the visible area determination unit divides the visible area in the cluster into a binocular visible area and a monocular visible area, and the display information design conversion unit converts a position or shape of display information overlapping in the monocular visible area among at least one display information displayed in the cluster.

3. The apparatus for improving visibility of cluster design elements based on a driver's view according to claim 2, wherein the display information design conversion unit converts the position or shape of the display information overlapping in the monocular visible area to place the display information in the visible area.

4. The apparatus for improving visibility of cluster design elements based on a driver's view according to claim 2, wherein the display information detection unit calculates complexity of the display information overlapping in the monocular visible area, the display information design conversion unit determines whether to convert the shape or position of the display information overlapping in the monocular visible area based on the calculated complexity, and the complexity is determined based on an amount and variation of color information included in a unit area within the cluster.

5. The apparatus for improving visibility of cluster design elements based on a driver's view according to claim 4, wherein the display information design conversion unit lowers a resolution of part or the entirety of the display information overlapping in the monocular visible area.

6. The apparatus for improving visibility of cluster design elements based on a driver's view according to claim 2, wherein the display information detection unit detects whether part or the entirety of the display information overlaps in the monocular visible area and the invisible area, and the display information design conversion unit moves the position of the display information when the entire display information overlaps and reduces a size of the display information or rotates the display information when part of the display information overlaps.

7. A method for improving visibility of cluster design elements based on a driver's view, performed by a computing device, the method comprising:

detecting an eye position of the driver from a face image captured through a camera in a vehicle;

determining a visible area and an invisible area in a cluster based on the detected eye position, a position of the cluster in the vehicle and a position of a steering wheel;

detecting a position and shape of display information displayed on the cluster; and converting a position or shape of display information overlapping in the invisible area among the display information.

8. A computer program stored in a non-transitory computer-readable recording medium to perform the method according to claim 7, in combination with hardware.

* * * * *